United States Patent
Yuan et al.

(10) Patent No.: US 11,829,616 B2
(45) Date of Patent: Nov. 28, 2023

(54) METHOD FOR DETERMINING A HARD DISK CONNECTION SLOT CONNECTED TO A HARD DISK AND TERMINAL DEVICE

(71) Applicant: Fulian Precision Electronics (Tianjin) Co., LTD., Tianjin (CN)

(72) Inventors: Jie Yuan, Tianjin (CN); Shi-Qi Chen, Tianjin (CN)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 60 days.

(21) Appl. No.: 17/705,517

(22) Filed: Mar. 28, 2022

(65) Prior Publication Data
US 2023/0185464 A1  Jun. 15, 2023

(30) Foreign Application Priority Data
Dec. 14, 2021 (CN) .......................... 202111529421.X

(51) Int. Cl.
*G06F 3/00* (2006.01)
*G06F 3/06* (2006.01)

(52) U.S. Cl.
CPC ............ *G06F 3/0629* (2013.01); *G06F 3/061* (2013.01); *G06F 3/0676* (2013.01)

(58) Field of Classification Search
None
See application file for complete search history.

(56) References Cited

U.S. PATENT DOCUMENTS

| | | | | |
|---|---|---|---|---|
| 5,136,709 A | * | 8/1992 | Shirakabe | G06F 8/54 719/327 |
| 2013/0097341 A1 | * | 4/2013 | Oe | G06F 3/0611 710/15 |
| 2022/0269428 A1 | * | 8/2022 | Gong | G06F 3/0673 |

FOREIGN PATENT DOCUMENTS

CN   104699423 A   6/2015

* cited by examiner

*Primary Examiner* — Midys Rojas
(74) *Attorney, Agent, or Firm* — ScienBiziP, P.C.

(57) ABSTRACT

A method for identifying a connection slot used by a hard disk includes determining the name of a program or system kernel connected to a hard disk; determining slot information corresponding to the kernel name; generating a soft link relating the kernel name to the slot information. The soft link has a relationship with and coexists with the kernel name. A terminal device and a non-volatile storage medium therein, for performing the above-described method, are also disclosed.

20 Claims, 4 Drawing Sheets

METHOD FOR DETERMINING A HARD DISK CONNECTION SLOT CONNECTED TO A HARD DISK AND TERMINAL DEVICE

FIELD

The subject matter herein generally relates to field of computing, more specifically to a method for binding slot and a terminal device for clearly displaying the connecting slot corresponding to hard disk.

BACKGROUND

Multiple types of connection slots can be connected to hard disks to store data on a computer. The computer or server can match the name of the program kernel to multiple hard disks. Users can get the slot information matching the program kernel name through open-source commands or manufacturer tools, and then identify the connection slot currently connected to the hard disk through the interpretation of the slot information. When a hard disk fails, such as reading failure, the operator needs to remove the failed hard disk. To find the slot where the failed hard disk is located, the operator needs to obtain the slot information through the analysis of the program kernel before finding the slot where the failed hard disk is located. The above implementation process is cumbersome and inconvenient for users to operate.

Therefore, there is a room for improvement.

BRIEF DESCRIPTION OF THE DRAWINGS

Implementations of the present disclosure will now be described, by way of embodiments, with reference to the attached figures.

DETAILED DESCRIPTION

Figure 1:
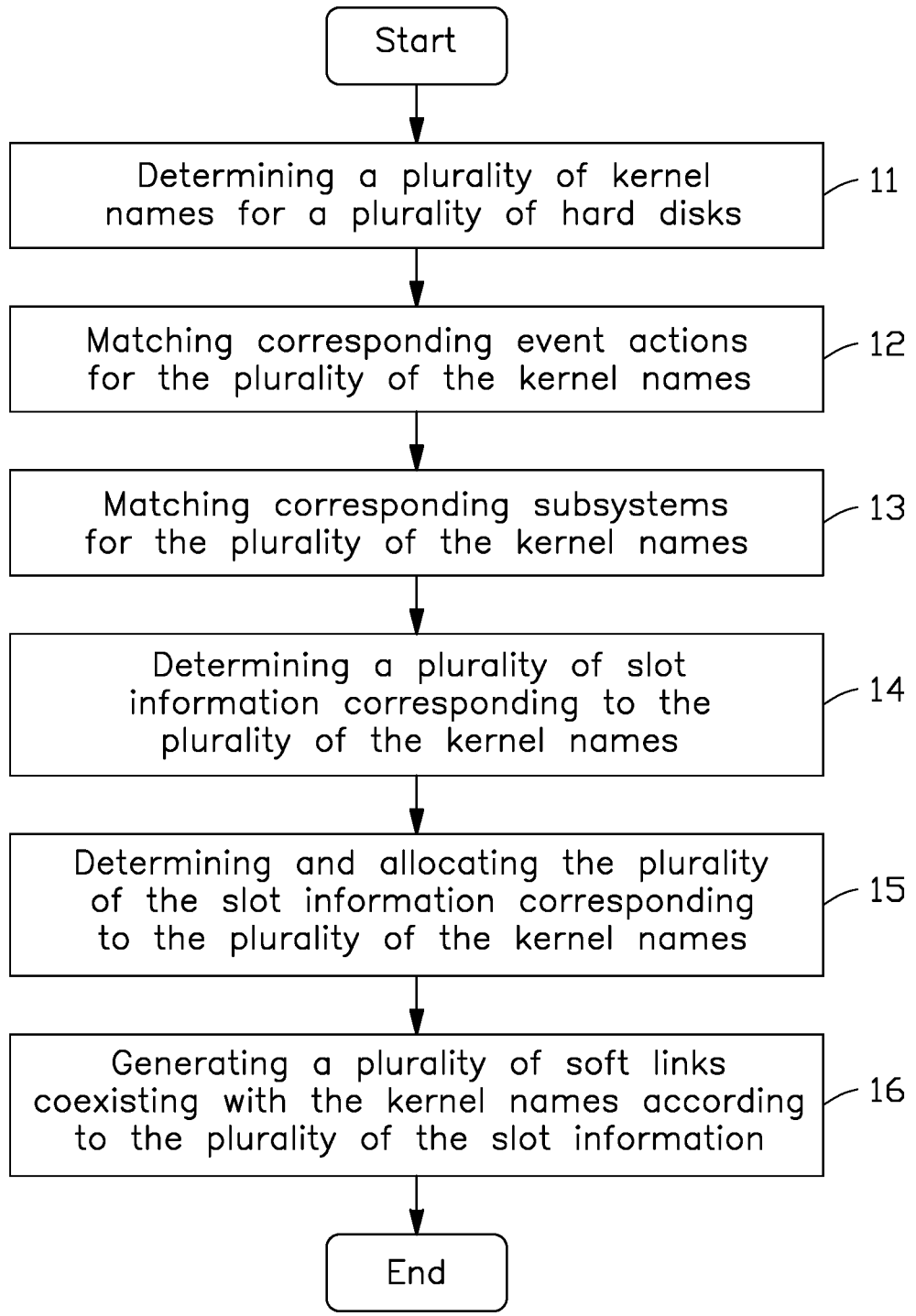
FIG. 1 is flowchart of an embodiment of a method for identifying a connection slot of a hard disk according to the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

A computer or a server can offer a plurality of connection slots for insertion of a device. When the device is inserted into the slot, the user can view the slot corresponding to the device by operating the computer or the server. The device may be a hard disk.

For example, in a server with a host bus adapter (HBA), the HBA is used for the plug-in and installation of a plurality of hard disks. The server can run the Linux system. The Linux system assigns the hard disk drive letter according to the scanned hard disk sequence, and the connection of the slots and the slot information can be realized through the configuration information of the host bus adapter. Users can determine the slot information corresponding to the hard disk drive letter through open-source commands or manufacturer tools.

For example, when at least one hard disk fails and needs to be removed, the user needs to operate the hard disk inserted in a slot. The user needs to first determine the name of program or system kernel (kernel name) corresponding to the slot, and then operate the hard disk corresponding to the kernel name. The above implementation process is cumbersome and inconvenient for the user.

In order to solve the above problems, the embodiment of the present disclosure provides a method for easy identification of a connection slot. The method sets a soft link to display the slot information corresponding to the hard disk in the directory. The user can operate the soft link to realize the operation of the hard disk corresponding to the soft link, simplifying the steps and improving the user's operation convenience.

FIG. 1 shows a flow chart of one embodiment of a method for connection slot of the present disclosure.

Figure 4:
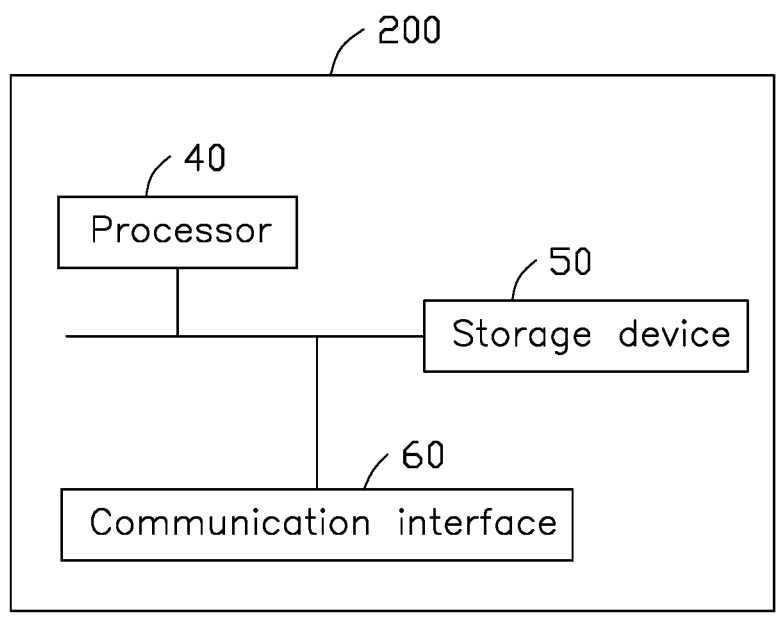
FIG. 4 is block diagram of an embodiment of a terminal device according to the present disclosure.

In one embodiment, the method can be applied to a terminal device 200 (shown in FIG. 4). The function for connection slots provided by the method of the present disclosure can be directly integrated on the terminal device 200, or run on the terminal device 200 in the form of a software development kit (SDK).

As shown in FIG. 1, the method according to the embodiment of the present disclosure includes the following steps:

At block 11, determining a plurality of kernel names for a plurality of hard disks.

In the server, the kernel name can be automatically recognized by the system running in the server, and the specific device corresponding to the kernel name can be known by identifying the kernel name. When the device is the hard disk, it can be determined that the device corresponding to the kernel name is a certain hard disk by identifying the kernel name.

It can be understood that the kernel name corresponding to the hard disk can be the hard disk drive letter. The server runs the Linux system, and the Linux system allocates the hard disk drive letter according to the scanned order of the hard disks installed. For example, the hard disk drive letters sda are assigned to the first hard disk scanned, the hard disk drive letters sdb are assigned to the second hard disk scanned.

It can be understood that in the Linux system, the system can match the kernel name for each device by executing the rule, for example, assigning the next in a sequence of hard disk drive letters to a new hard disk.

In a server equipped with a host bus adapter, the naming format of the hard disk letter allocated by the Linux system after scanning the hard disk can be preset when the server leaves the factory. For example, the hard disk drive letter may be sda to sdz. It can be understood that the hard disk drive letters are located in the /dev/directory in the Linux system, such as /dev/sda, /dev/sdb.

At block 12, matching events or actions (event actions) to the plurality of kernel names.

The event actions can include action of adding and action of modifying.

In the Linux system, the event action corresponding to the kernel name can be matched by running the file of rules, and the event actions can be matched at the same time, for example, the add action or the modify action can be matched.

At block 13, matching subsystems for the plurality of the kernel names.

In the Linux system, there are many kinds of the subsystems, such as block device subsystem, character device subsystem, and network device subsystem. According to the different subsystems corresponding to the device, it is necessary to determine which subsystem the subsystem corresponding to the kernel name is when modifying or adding the kernel name, and thus avoid errors in actions when modifying or adding the kernel name.

In the Linux system, the kernel name can be matched with the corresponding subsystem by running the rule file.

In one possible scenario, when the user knows in advance what kind of connection slot the device needs, the subsystem corresponding to the device can be written in the rule file. For example, when determining that the device is the hard disk, it can be determined that the subsystem is a block device subsystem. In another possible scenario, the user can know the subsystem corresponding to the device requiring a slot connection through a third-party tool according to the real-time requirements. When the rule file is running, the subsystem corresponding to the device determined by the third-party tool can be obtained by directly obtaining or calling up scripts and other methods.

For example, the subsystem corresponding to the hard disk is a block device subsystem, and the user can specify in advance that the matched subsystem is a block device subsystem in the rule file.

The specific content can be SUBSYSTEM=="block".

At block 14, determining information corresponding to each of the plurality of the kernel names.

It can be understood that the server or the computer entity is provided with a plurality of connection slots, and the slots are used to provide installation locations for each of the plurality of the hard disks.

In the Linux system, the slot information corresponding to the kernel name can be queried by using open-source commands or manufacturer tools. The slot information corresponds to the slot. The present disclosure can know the hard disk corresponding to the kernel name by identifying the slot information, and which connection slot is being used by the hard disk.

Figure 2:
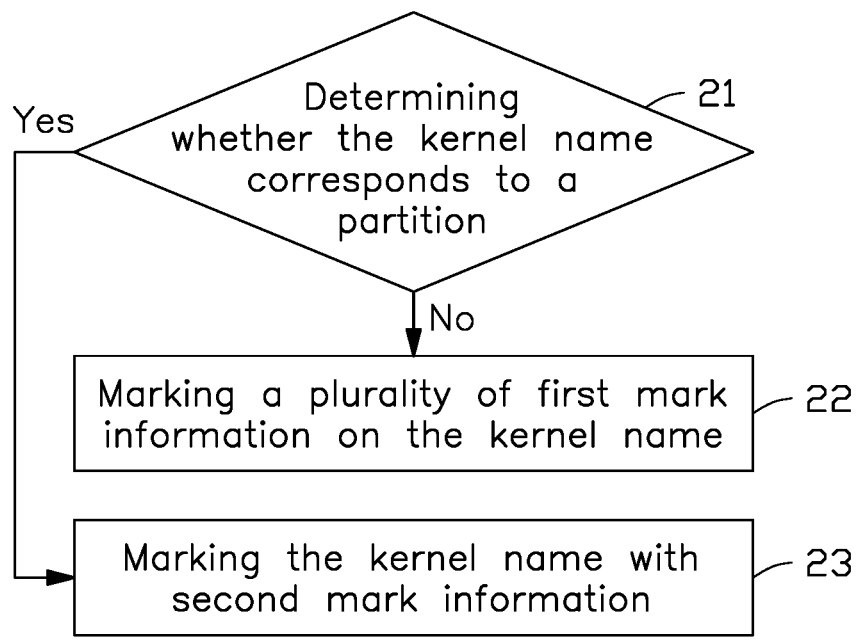
FIG. 2 is flowchart of another embodiment of a method according to the present disclosure.

In one embodiment, as shown in FIG. 2, the specific method of determining the slot information corresponding to the kernel names can include the following steps:

At block 21, determining whether the kernel name corresponds to a partition. If the kernel name does not correspond to a partition, block 22 is implemented, otherwise block 23 is implemented.

There can be a plurality of partitions in the hard disk, and the partitions in the hard disk are set manually by the user to facilitate storage.

The hard disk drive letter may include a first drive letter and a second drive letter, and there is a difference in the naming format between the first drive letter and the second drive letter. When there is no partition in the hard disk, the kernel name of the hard disk is the first drive letter. When there are partitions in the hard disk, each partition of the hard disk has a separate kernel name, and the kernel name of the partition of the hard disk is the second drive letter.

For example, when there is no partition in the hard disk, the corresponding first drive letter can be sda, sdb, etc. When the first drive letter is sda, it means that the device corresponding to the first drive letter is the first hard disk. When the first drive letter is sdb, it means that the device corresponding to the first drive letter is the second hard disk.

For example, when the hard disk has partitions, the second drive letters corresponding to the partitions of the hard disk can be sda1, sda2, etc. When the second drive letter is sda1, it means that the second drive letter corresponds to the first partition of the first hard disk. When the second drive letter is sda2, it means that the second drive letter corresponds to the second partition of the first hard disk.

It can be understood that the Linux system can know whether there is a partition in the hard disk by scanning the hard disk. Due to the difference in naming format between the second drive letter and the first drive letter, it is also possible to clearly know whether there is a partition in the hard disk by identifying the matching second drive letter and the first drive letter.

At block 22, marking first mark information on the kernel name.

When there is no partition in the hard disk, the kernel name of the hard disk is the first drive letter. After marking the first mark information on the first drive letter, it is no longer necessary to identify the content of the first drive letter when performing other operations on the first drive letter. Only by identifying the marked first mark information, can it be known that there is no partition in the hard disk corresponding to the first drive letter.

It can be understood that the identification of the first mark information is easier than the identification of the content of the kernel name.

At block 23, marking the kernel name with second mark information.

When there is partition in the hard disk, the kernel name of the hard disk is the second drive letter. After marking the second mark information on the second drive letter, it is no longer necessary to identify the second drive letter when performing other operations on the second drive letter, it is only by identifying the marked second mark information, that a user will know there is no partition in the hard disk corresponding to the second drive letter.

It can be understood that the identification of the second mark information is easier than the identification of the content of the kernel name.

For the plurality of the kernel names, blocks 21-23 are performed in order on each kernel name, so that each of the kernel names is marked with the corresponding mark information.

At block 15, determining and allocating the information as to connection slots corresponding to each of the plurality of the kernel names.

According to the kernel name, the embodiment of the present disclosure can query the slot information corresponding to the hard disk which corresponds to the kernel name through the open-source commands or the manufacturer tools.

It can be understood that each kernel name can correspond to the information as to each slot.

For example, according to the hard disk drive letter, the slot information corresponding to the hard disk can be queried through lsscsi command of the open-source or the manufacturer tool.

The kernel names are the first drive letter and the second drive letter respectively, and the determined slot information is different. The slot information can include a first slot information and a second slot information. When determining the slot information corresponding to the kernel name, the first slot information can be determined and allocated to the first drive letter, and the second slot information can be determined and allocated to the second drive letter.

The naming format of the contents of the first slot information and the second slot information is different, the first slot information corresponds to a hard disk without partition, and the second slot information corresponds to a hard disk with partition.

For example, the content of the first slot information can be slot0, slot1, etc. The content of the first slot information is slot0, which means that the hard disk is inserted into the first slot, the content of the first slot information is slot1, which means that the hard disk is inserted into the second slot, and so on.

For example, the content of the second slot information can be slot0-part1, slot0-part2, etc. The content of the second slot information is slot0-part1, which indicates that there is a partition of the hard disk, that the hard disk is inserted into the first slot, and that the kernel name corresponds to the first partition of the hard disk.

When allocating the first slot information and the second slot information, it can determine whether the hard disk corresponding to the kernel name has a partition by identifying the first mark information and the second mark information. When the kernel name is marked with the first mark information, it can be determined that there is no partition in the hard disk corresponding to the kernel name. At this time, the corresponding first slot information is allocated to the kernel name. When the kernel name is marked with the second mark information, it can be determined that the partition corresponding to the kernel name is the partition of the hard disk. At this time, the corresponding second slot information is allocated to the kernel name.

The kernel name can be the first drive letter, and a plurality of the first drive letters corresponds to the information of the plurality of the first slots. The kernel name can be the second drive letter, then the plurality of the second drive letters corresponds to information of the plurality of the second slots.

At block 16, generating a plurality of soft links coexisting and in relationship with the kernel names according to the plurality of the slot information.

The naming content of the generated soft link can refer to the content of the slot information. For example, the content of the slot information can be slot0, and the naming of the soft link can also be slot0.

The soft link may include a first soft link and a second soft link, the kernel name corresponding to the hard disk is the first drive letter, the first drive letter corresponds to the first slot information, and the first soft link corresponds to the first slot information. The kernel name corresponding to the hard disk is the second drive letter, the second drive letter corresponds to the second slot information, and the second connection corresponds to the second slot information.

In the Linux system, the soft link is located in the same directory as the kernel name.

For example, the kernel name can be the first drive letter, which is /dev/sda in the /dev directory. The content of the first slot information corresponding to the first drive letter is slot0, and the soft link corresponding to the first drive letter is /dev/slot0 in the /dev directory.

For example, the kernel name can be the second drive letter, which is /dev/sda1 in the /dev directory, the content of the second slot information corresponding to the second drive letter is slot0-part1, and the soft link corresponding to the first drive letter is /dev/slot0-part1 in the /dev directory.

It can be understood that blocks 11-16 can run the rule file through the Linux system.

For example, the specific content of the rule file may be: KERNEL=="sd*[a-z0-9]", ACTION=="add|change", SUBSYSTEM=="block", PROGRAM="/root/sd_slot_alias.sh %k", SYMLINK+="%c".

KERNEL is used to match the kernel name of the device, corresponding to block 11. The kernel name can be the preset name of the device in the memory file system. ACTION is used to match the event action with the kernel name, corresponding to block 12. The matched event action is the adding action or the modifying action. SUBSYSTEM is used to match the corresponding subsystem to the device, corresponding to block 13, and the matching to the hard disk is the block device system. PROGRAM is used to call sd_slot_alias.sh script to implement block 14 and block 15, where %k is the kernel name of the device, the sd_slot_alias.sh script obtains the corresponding slot information according to the kernel name. SYMLINK is used to obtain the slot information according to the sd_slot_alias.sh script, and creates the soft link corresponding to the slot information, which corresponds to block 16.

The rule file can be compiled by the user. In the Linux system, the rule file can be the rule file of the device manager (udev), and the rule file is stored in the system rules directory/usr/lib/udev/rules. d, runtime rule directory/run/udev/rules. d and native rule directory/etc/udev/rules. d.

In the Linux system, for the rule files with the same name in different directories, only the rule files in the directory with the highest priority prevail. The priority of directory/etc/is the highest, the priority of directory/run/is in the middle, and the priority of directory/usr/lib/is the lowest.

In the embodiment of the present disclosure, there is no restriction as to the directory in which the rule file is located, and the rule file is only in /etc/udev/rules. d, and the suffix is to take the rule file of rules as an example.

It can be understood that when the rule file is updated and the user needs to run the rule file, the rule file can be loaded by restarting the server or using the udevadm control—reload-rules command.

In a server equipped with a host bus adapter, due to the instability of the firmware in the host bus adapter, there is a probability of the hard disk drive letter drifting, and the hard disk drive letters are easy to change when the server is running, this may lead to the reading or storage of files by the user in the wrong directory. When the soft link is generated, the soft link corresponds to the connection slot of the physical layer, so the soft link is more stable than the hard disk letter. The user can interactively operate the soft link, and then store or read information in the hard disk corresponding to the soft link.

In some possible scenarios, the user needs to test multiple hard disks and partitions in the hard disks. For example, when performing data reading and writing test, the user can select the soft link as the test address to avoid test errors in some hard disks or partitions of the hard disk caused by drifting of the hard disk drive letter.

Figure 3:
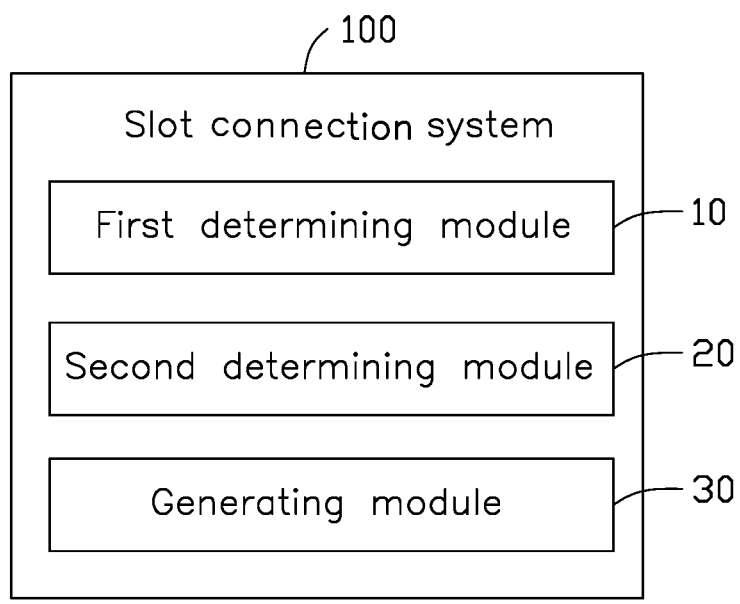
FIG. 3 is a block diagram of an embodiment of a system for identifying a connection slot according to the present disclosure.

FIG. 3 illustrates a slot connection system 100 in accordance with an embodiment of the present disclosure.

The slot connection system 100 can include a plurality of modules. The plurality of modules can comprise computerized instructions in a form of one or more computer-readable programs that can be stored in a non-transitory computer-readable medium (such as a storage device of the computer device), and executed by at least one processor of the terminal device to implement binding function (described in detail in FIG. 1).

The slot connection system 100 may include functional modules consisting of program code. The functional modules can include a first determining module 10, a second determining module 20, and a generating module 30.

The first determining module 10 is configured to determine the kernel name of the hard disk.

The hard disks each correspond to a kernel name.

The first determining module 10 can determine the hard disk drive letter of the hard disk, specifically the first drive letter or the second drive letter.

The second determining module 20 is configured to determine and allocate the slot information corresponding to the kernel name. The plurality of the kernel names corresponds to the plurality of the slot information. The slot information can include the first slot information and the second slot information. When the first mark information is marked on the first drive letter, the second determination module 20 can determine and allocate the corresponding first slot information to the first drive letter. When the second mark information is marked on the second drive letter, the second determination module 20 can determine and allocate the corresponding second slot information to the second drive letter.

The generating module 30 is configured to generate the soft link relation (that is, in a relationship) existing with the kernel name according to the slot information. The plurality of the slot information corresponds to the plurality of the soft links. For the first slot information, the generating module 30 generates the corresponding first soft link. For the second slot information, the generating module 30 generates the corresponding second soft link.

In the embodiment of the present disclosure, the specific implementation of each module can also refer to the description of the method embodiment shown in FIGS. 1 to 2.

In the slot connection system 100 described in FIG. 3, the soft link corresponding to the slot can be clearly displayed in the Linux system for user interaction and increase the convenience of users. Details are explained in the specific embodiment of the above slot connection method, which will not be repeated here.

FIG. 4 illustrate a terminal device 200 in accordance with an embodiment of the present disclosure.

In one embodiment, the terminal device 200 can include the above slot connection system 100. The system is specifically described in FIG. 3.

The terminal device 200 can further include, but is not limited to, a storage device 50, at least one processor 40, and a communication interface 60. The processor 40, the storage device 50 and the communication interface 60 can be connected and communicate with each other through a communication bus. The processor 40 may execute the program code of program segment stored in the storage device 50 to implement blocks 11-16 in method shown in FIG. 1 and blocks 21-23 in method shown in FIG. 2. The processor 50 may execute the program code of program segment to implement the functions of a slot connection system 100 shown in FIG. 3.

The modules 10-30 include computer instructions or codes in form of one or more programs that may be stored in the storage device 50, and which are executed by the at least one processor 40. In other embodiment, the modules 10-30 may also be a program instruction or firmware that is embedded in the processor 40.

The block diagram merely shows an example of the terminal device 200 and does not constitute a limitation to the terminal device 200. In other examples, more or less components than those illustrated may be included, or some components may be combined, or different components used. For example, the terminal device 200 may also include input and output devices, a network access devices, a bus, and the like.

The processor 40 may be a central processing unit (CPU), or may be other general purpose processor, a digital signal processor (DSP), an application specific integrated circuit (ASIC), a Field-Programmable gate array (FPGA) or other programmable logic device, a transistor logic device, a discrete hardware component. The general purpose processor may be a microprocessor. The processor 40 may also be any conventional processor. The processor 40 is a control center of the terminal device 200. The processor 40 connects the parts of the terminal device 200 by using various interfaces and lines.

The storage device 50 can be used to store program segments. The processor 40 operates or executes the program segments stored in the storage device 50 and recalls data stored in the storage device 50, and implements various functions of the terminal device 200. The storage device 50 may mainly include a storage program area and a storage data area, the storage program area may store an operating system, an application (such as sound playback and image playback) required for at least one function. The storage data area may store data created.

The storage device 50 may include a RAM, and may also include non-volatile memory such as a hard disk, a memory, a plug-in hard disk, a smart memory card (SMC), and a Secure Digital (SD) card, a flash card, at least one disk storage device, flash device, or other volatile or non-volatile solid-state storage device.

The modules and units integrated by the terminal device 200, if implemented in the form of software functional units and sold or used as separate products, may be stored in a computer readable storage medium. Based on such understanding, the present disclosure implements all or part of the processes in the foregoing embodiments, and the purposes of the disclosure may also be implemented and achieved by a computer program instructing related hardware. The computer program may be stored in a computer readable storage medium. The steps of the various method embodiments described above may be implemented by a computer program when executed by a processor. The computer program includes a computer program code, which may be in the form of source code, object code form, executable file, or some intermediate form. The computer readable medium may include any entity or device capable of carrying the computer program code, a recording medium, a USB flash drive, a removable hard disk, a magnetic disk, an optical disk, a computer memory, a read-only memory (ROM), a random access memory (RAM), electrical carrier signals, telecommunications signals, and software distribution media.

The terminal device 200 shown in FIG. 4 can indicate and display the soft link corresponding to the slot in the Linux system for user interaction and improve the convenience of users.

Based on the same concept, the embodiment of the present disclosure also provides a non-transitory storage medium. The computer instruction is stored in the non-transitory storage medium. When the instruction runs on the terminal device 200, the terminal device 200 can execute the slot connection method provided by the above embodiment.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A method for identifying a connection slot comprising:
determining a kernel name of a hard disk;
determining slot information corresponding to the kernel name; and
generating a soft link corresponding to the kernel name according to the slot information;
wherein the soft link coexists with the kernel name;
wherein format of the soft link is slot$\alpha$ or slot-part$\beta$, $\alpha$ is a natural number and is related to the slot information, $\beta$ is a positive integer, and the format of the kernel name is sd$\gamma$ or sd$\gamma\delta$, $\gamma$ is an English alphabet, $\delta$ is a positive integer.

2. The method according to claim 1, further comprising:
determining whether the kernel name corresponds to a partition;
adding a first mark information to the kernel name if the kernel name is determined not corresponding to a partition; and
adding a second mark information to the kernel name if the kernel name is determined corresponding to a partition.

3. The method according to claim 2, wherein the slot information comprises a first slot information and a second slot information.

4. The method according to claim 3, further comprising:
allocating the first slot information to the kernel name with the first mark information; and
allocating the second slot information to the kernel name with the second mark information.

5. The method according to claim 4, further comprising:
generating a first soft link according to the first slot information, wherein the first soft link coexists with the kernel name; and
generating a second soft link according to the second slot information, wherein the first soft link coexists with the kernel name.

6. The method according to claim 1, further comprising:
matching corresponding event actions to the kernel name, wherein the event actions comprise add action and modify action.

7. The method according to claim 1, further comprising:
matching a corresponding subsystem with the kernel name;
wherein the kernel name and the soft link corresponding to the kernel name are located in a same directory.

8. A terminal device comprising:
a storage device; and
at least one processor, wherein the storage device stores one or more programs, when executed by the at least one processor, the one or more programs cause the at least one processor to:
determine a kernel name of a hard disk;
determine slot information corresponding to the kernel name; and
generate a soft link corresponding to the kernel name according to the slot information; wherein the soft link coexists with the kernel name; wherein format of the soft link is slot$\alpha$ or slot-part$\beta$, $\alpha$ is a natural number and is related to the slot information, $\beta$ is a positive integer, and the format of the kernel name is sd$\gamma$ or sd$\gamma\delta$, $\gamma$ is an English alphabet, $\delta$ is a positive integer.

9. The terminal device according to claim 8, wherein the at least one processor is further caused to:
determine whether the hard disk corresponding to the kernel name is a partition;
add a first mark information to the kernel name if the kernel name is determined not corresponding to a partition; and
add a second mark information to the kernel name if the kernel name is determined corresponding to a partition.

10. The terminal device according to claim 9, wherein the slot information comprises a first slot information and a second slot information.

11. The terminal device according to claim 10, wherein the at least one processor is further caused to:
allocate the first slot information to the kernel name with the first mark information; and
allocate the second slot information to the kernel name with the second mark information.

12. The terminal device according to claim 11, wherein the at least one processor is further caused to:
generate a first soft link according to the first slot information, wherein the first soft link coexists with the kernel name; and
generate a second soft link according to the second slot information, wherein the first soft link coexists with the kernel name.

13. The terminal device according to claim 8, wherein the at least one processor is further caused to:
match a corresponding event action to the kernel name, wherein the event actions comprise add action and modify action.

14. A non-transitory storage medium having stored thereon instructions that, when executed by a processor of a computer device installed in a terminal device, causes the processor to perform a connection slot method, wherein the method comprises:
determining a kernel name of a hard disk;
determining slot information corresponding to the kernel name; and
generating a soft link corresponding to the kernel name according to the slot information; wherein the soft link coexists with the kernel name; wherein format of the soft link is slot$\alpha$ or slot-part$\beta$, $\alpha$ is a natural number and is related to the slot information, $\beta$ is a positive integer, and the format of the kernel name is sd$\gamma$ or sd$\gamma\delta$, $\gamma$ is an English alphabet, $\delta$ is a positive integer.

15. The non-transitory storage medium according to claim 14, further comprising:

determining whether the hard disk corresponding to the kernel name is a partition;

adding a first mark information to the kernel name if the kernel name is determined corresponding to a partition; and adding a second mark information to the kernel name if the kernel name is determined corresponding to a partition.

16. The non-transitory storage medium according to claim 15, wherein the slot information comprises a first slot information and a second slot information.

17. The non-transitory storage medium according to claim 16, further comprising:

allocating the first slot information to the kernel name with the first mark information; and allocating the second slot information to the kernel name with the second mark information.

18. The non-transitory storage medium according to claim 17, further comprising:

generating a first soft link according to the first slot information, wherein the first soft link coexists with the kernel name; and generating a second soft link according to the second slot information, wherein the first soft link coexists with the kernel name.

19. The non-transitory storage medium according to claim 14, further comprising:

matching corresponding event actions to the kernel name, wherein the event actions comprise add action and modify action.

20. The non-transitory storage medium according to claim 14, further comprising:

matching a corresponding subsystem with the kernel name;

wherein the kernel name and the soft link corresponding to the kernel name are located in a same directory.

\* \* \* \* \*